July 26, 1966     W. HEINLEIN ET AL     3,262,335
CONNECTING ROD TRANSMISSIONS FOR COMPRESSORS AND THE LIKE
Filed Feb. 27, 1964     2 Sheets-Sheet 1
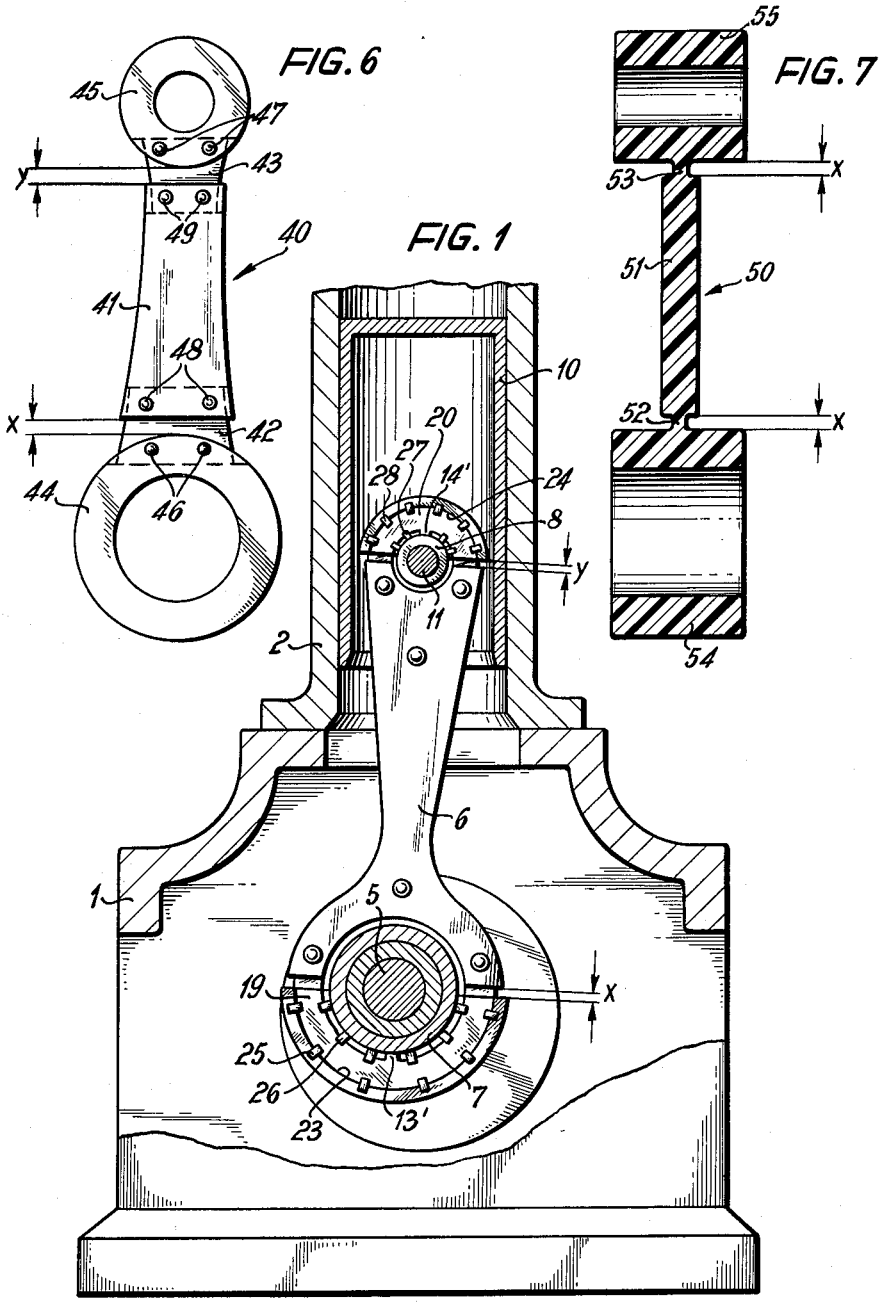

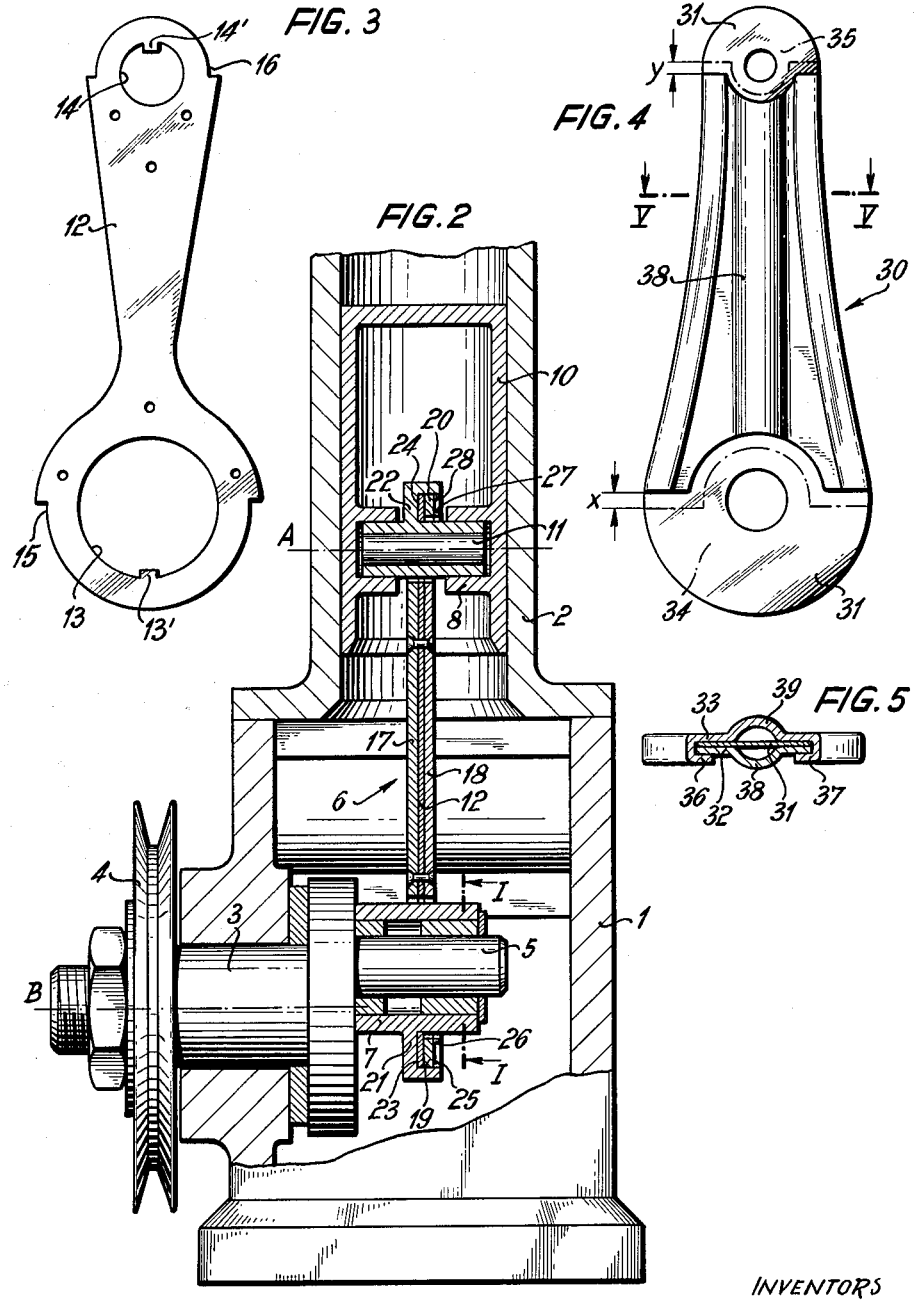

United States Patent Office 3,262,335
Patented July 26, 1966

3,262,335
CONNECTING ROD TRANSMISSIONS FOR COMPRESSORS AND THE LIKE
Werner Heinlein, Stuttgart, and Alexander von Löwis of Menar, Boblingen, Germany, assignors to Robert Bosch G.m.b.H., Stuttgart, Germany
Filed Feb. 27, 1964, Ser. No. 347,865
Claims priority, application Germany, Mar. 1, 1963, B 70,934
15 Claims. (Cl. 74—581)

The present invention relates to transmissions and in particular to connecting rod transmissions for compressors or the like.

The invention is particularly applicable to air compressors of the type used to provide compressed air for shock absorbers and suspension assemblies for automobiles.

It is essential in transmissions of this type that the axis of a rotary crank whose rotation is transmitted by a connecting rod to a piston be precisely parallel to the turning axis of the connecting rod relative to the piston. Therefore, in order to maintain the crank axis and the tuning axis of the connecting rod relative to the piston precisely parallel to each other extreme care must be exercised in the manufacture of the transmission assembly. The precise parallelism between these axes is required to prevent undesired twisting forces during transmission of the rotary movement of the crank to the piston for reciprocating the latter.

In order to avoid these difficulties it is already known to provide the connecting rod assembly with ball-and-socket joints at the ends of the connecting rod assembly which are respectively connected with the rotary crank and the piston so that in this way it is possible for the structure to automatically compensate for any lack of parallelism between the crank axis and the turning axis of the connecting rod relative to the piston. Also, it is known to provide the connecting rod assembly with a universal joint structure for the same purpose.

These known structures, however, have the disadvantage of being very complex and expensive as well as of including a relatively large number of components which provide undesired sources of faulty operation.

A primary object of the present invention is to provide a transmission of the above type capable of automatically compensating for any lack of parallelism between the crank axis and the turning axis of the connecting rod relative to the piston while at the same time being extremely simple and inexpensive and including a very small number of components so that the possible sources of faulty operation are reduced to a minimum.

A further object of the present invention is to provide a structure of the above type which is very easy to assemble.

Also, it is an object of the present invention to provide a structure of the above type which can transmit relatively large forces between the rotary crank means and piston while compensating for any lack of parallelism between the crank axis and the turning axis of the connecting rod relative to the piston.

With the above objects in view the invention includes, in a connecting rod transmission for compressors or the like, a rotary crank means having a crank axis about which the rotary crank rotates. A cylinder is perpendicular to the crank axis and a piston is axially slidable in this cylinder. An elongated connecting rod means extends between and is operatively connected to the rotary crank means and the piston for reciprocating the latter in response to rotation of the rotary crank means, and this connecting rod means has a predetermined turning axis relative to the piston. This latter turning axis is substantially parallel to the crank axis. In accordance with the invention the connecting rod means has at least one, and preferably two, portions which form but a relatively small part of the connecting rod means and which are springy and yieldable, while the remainder of the connecting rod means is relatively rigid. Therefore, the connecting rod means can yield at its yieldable portions to compensate for any lack of parallelism between the crank axis and the turning axis of the connecting rod means relative to the piston, while at the same time the connecting rod means is capable of transmitting relatively large forces between the rotary crank means and piston.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is a longitudinal sectional elevation of one possible embodiment of a transmission according to the invention, the section of FIG. 1 being taken in a plane normal to the crank axis;

FIG. 2 is a sectional elevation of the structure of FIG. 1 taken in a plane perpendicular to the section of FIG. 1 and including the crank axis;

FIG. 3 is an elevational view of a springy plate which forms part of the connecting rod means of FIGS. 1 and 2;

FIG. 4 is an elevational view of another embodiment of a connecting rod means according to the invention;

FIG. 5 is a transverse sectional plan view of the structure of FIG. 4 taken along line V—V in the direction of the arrows;

FIG. 6 is an elevational view of a further embodiment of a connecting rod means according to the invention; and FIG. 7 is a longitudinal sectional elevation of yet another embodiment of a connecting rod means according to the invention, the section of FIG. 7 being taken in a plane which includes the axes of the bearings of the connecting rod means of this embodiment.

Referring to FIGS. 1 and 2, the structure illustrated therein includes a crank housing 1 and a cylinder 2 carried thereby. The crank housing 1 supports a crank means 3 for rotary movement about the crank axis B shown in FIG. 2. The part of the crank means 3 which extends outwardly beyond the housing 1 fixedly carries a pulley 4 adapted to be driven by a belt which in turn is driven from any suitable source of power. Within the housing 1 the crank means 3 includes a crank pin 5 displaced from and rotating about the crank axis B during rotation of the crank means 3.

A piston 10 is axially slidable within the cylinder 2, and a connecting rod means 6 extends between and is operatively connected to the rotary crank means 3 and the piston 10 for reciprocating the latter in response to rotation of the crank means 3. The connecting rod means 6 has a turning axis A (FIG. 2) relative to the piston 10, and this axis A is substantially parallel to the axis B. In accordance with the present invention the connecting rod means 6 is constructed in such a way that while it can transmit a considerable force between the rotary crank means 3 and the piston 10, nevertheless the connecting rod means 6 is capable of yielding to compensate for any lack of parallelism between the turning axis A and the crank axis B.

The crank pin 5 is journalled within a bearing assembly 7 which extends with clearance through an opening formed at the lower relatively wide end of the connecting rod means 6, while a similar bearing 8 extends transversely of the piston 10, has an axis coinciding with the turning axis A, and extends with clearance through an opening formed in the upper narrower end of the connecting rod means 6. The bearing 8 is maintained in the illustrated position with the aid of a transverse piston pin 11 the axis of which coincides with the turning axis A.

The bearing 8 is shown diagrammatically in FIG. 2 with its ends received in a pair of coaxial sleeves which are illustrated as being integral with the piston 10 at the hollow interior thereof. In the actual structure at least one of these sleeves is removably connected with the piston 10 so that the structure can be assembled to provide the assembly illustrated in FIG. 2.

The connecting rod means 6 includes a flat springy plate member 12 as shown in detail in FIG. 3 and forming the principal component of the connecting rod means 6, this plate 12 carrying the remainder of the components of the connecting rod means 6. The springy plate 12 is formed with a relatively large opening 13 for the bearing 7 and with a relatively small opening 14 for the bearing 8. At these openings the plate 12 includes inwardly directed teeth 13' and 14' which respectively extend into mating notches or grooves formed in the bearings 7 and 8 so that the bearings 7 and 8 will be angularly oriented relative to the connecting rod means 6.

In order to prevent buckling of the plate 12 it is stiffened by a relatively rigid plate structure which is fixed to the plate 12, and this plate structure includes in the embodiment of FIGS. 1 and 2 a pair of elongated rigid plates 17 and 18 respectively riveted to opposed faces of the springy plate 12. The configuration of the plate 18 is apparent from FIG. 1 and the plate 17 has an identical configuration. As is shown in FIG. 3, the plate 12 is formed with six openings through which the rivets respectively pass to fix the rigid plates 17 and 18 with the springy plate 12. As is apparent from FIG. 1 the plate 18 terminates in a pair of end portions formed with substantially semi-circular notches which receive the bearings 7 and 8.

The bearings 7 and 8 are formed with integral rigid substantially semi-circular radial portions 21 and 22, respectively, these radial portions having a substantially L-shaped cross-section, as shown in FIG. 2. Thus, these radial portions of the bearings 7 and 8 form semi-circular grooves 23 and 24, respectively, which respectively receive the free ends of the plate 12, and it will be noticed from FIG. 3 that the peripheries 15 and 16 of the free ends of the plate 12 are inwardly offset with respect to the remainder of the plate 12 so that the peripheral portions 15 and 16 can be conveniently received within the grooves 23 and 24. A substantially semi-circular relatively rigid arcuate strip of metal 19 is received in the groove 23 and engages the right face of the plate 12, as viewed in FIG. 2, while a similar substantially semi-circular arcuate rigid strip of metal 20 is received in the groove 24 engaging the right face of the plate 12, as viewed in FIG. 2, and the free edge portions of the radial projections 21 and 22 have partially sheared therefrom projections 25 and 28 which engage the metal strips 19 and 20 at their outer arcuate peripheries to press the metal strips against the plate 12 so that the latter is also pressed against the walls of the radial projections 21 and 22 which are in a plane normal to the axes of the bearings 7 and 8. In order to further secure the parts in their assembled condition similar projections 26 and 27 are partially sheared from portions of the exterior of the bearings 7 and 8 which are directed toward the outer walls of the radial projections 21 and 22, and these partially sheared portions 26 and 27 also press against the metal strips 19 and 20, at the inner peripheries thereof, so that in this way the components of the transmission of the invention are assembled with each other. Thus, it will be seen that the bearings 7 and 8 together with the springy plate 12, the rigid plates 17 and 18 and the arcuate rigid strips 19 and 20 form a plate assembly which constitutes the connecting rod means 6.

In accordance with the present invention the stiffening plate 18 terminates in free ends which are spaced from the free ends of the strips 19 and 20 by the relatively small distances X and Y indicated in FIG. 1, and in the same way the plate 17, whose configuration is identical with that of plate 18, as pointed out above, terminates in free ends which are spaced by the same distances X and Y from the ends of the radial projections 21 and 22 of the bearings 7 and 8, so that the stiffening plate structure leaves portions of the springy plate 12, which form but a small part of the total connecting rod means 6, exposed. These exposed portions of the springy plate 12 provide the connecting rod means with yieldable springy portions capable of yielding to compensate for any lack of parallelism between the turning axis A and the crank axis B, and on the other hand, these yieldable portions of the connecting rod means form such a small fraction thereof that while the connecting rod means can twist in order to compensate for this lack of parallelism nevertheless it is capable of transmitting a large load.

Assuming, therefore, that the axes A and B are not precisely parallel, then during operation of the structure of the invention such a lack of parallelism is compensated for by twisting of the connecting rod means 6 in the regions X and Y, the springy plate 12 bending in the regions X and Y first one way and then the other way during each revolution of the crank means 3 and stroke of the piston 10. Of course, the piston itself rotates slightly about its axis in the cylinder 2 so that the piston itself does not substantially resist the twisting of the connecting rod means 6. Except for this bending in the very small regions X and Y the connecting rod means remains stiff and therefore is capable of transmitting a large load.

In the embodiment of a connecting rod means which is illustrated in FIGS. 4 and 5 the connecting rod means 30 includes a springy plate similar to the plate 12, but the stiffening plate structure is constructed differently. Thus, it will be seen that the connecting rod means 30 includes the springy plate 31 which is similar to the plate 12 and which is engaged at its opposed faces by the rigid stiffening plates 32 and 33. These plates extend, in the same way as the plates 17 and 18, up to the region of the bearings 34 and 35 which correspond to the bearings 7 and 8 described above. The plate 32 is as wide as the springy plate 31 and tapers in the same way as the plate 31 to the smaller end thereof where the bearing 35 is located. The bearings 34 and 35 are shown only diagrammatically in FIG. 4 and extend in the same way as the bearings 7 and 8 through openings formed at the end portions of the springy plate 31, and these bearings are fixed to the springy plate in the same way as the bearings 7 and 8. Thus, except for the plates 32 and 33 and the configuration of the springy plate 31 the embodiment of FIGS. 4 and 5 is identical with that of FIGS. 1 to 3. The stiffening plate 33 is wider than the plates 31 and 32 and terminates at its side edges in the elongated side edge portions 36 and 37 of channel-shaped configuration which receive in their interiors the edge portions of the plates 31 and 32 with a tight, snug fit, so that in this way the plates 32 and 33 provide the plate 31 with the desired rigidity, and in order to increase the stiffness of the plates 32 and 33 they are respectively formed with the elongated, longitudinal stiffening ribs 38 and 39 of substantially semi-circular cross-section as is apparent from FIG. 5. With this embodiment also there will be exposed regions X and Y of the springy plate 31 which are not covered by any stiffening plate structure so that the plate 31 can yield at its portions X and Y to compensate for any lack of parallelism between the axes A and B, as described above. Of course, the bearings 34 and 35 indicated only schematically in FIG. 4 cooperate in the same way as the bearings 7 and 8 with the crank means 3 and the piston 10.

In FIG. 6 there is also illustrated yet another embodiment of a connecting rod means in accordance with the present invention. This connecting rod means 40 as shown in FIG. 6 includes at its ends the bearings 44 and 45 which respectively surround the pins 5 and 11. An elongated rigid member 41 extends between the bearings 44 and 45 and terminates in free ends which are adjacent to but spaced from the bearings 44 and 45, and springy plates 42 and 43 extend across the spaces between the elongated rigid member 41 and the bearings to provide connecting rod means 40 with springy yieldable portions which will yield at the zones X and Y shown in FIG. 6 so as to compensate for any lack of parallelism in the axes A and B, as described above. The ends of the elongated rigid member 41 and the portions of the bearings 44 and 45 adjacent thereto are formed in a substantially central intermediate plane of the connecting rod means 40 with slits which receive the ends of the plates 42 and 43, and these plates as well as the members 41, 44 and 45 are formed with bores which receive the rivets 46–49 which serve to fix the springy plates 42 and 43 to the rigid components 41, 44 and 45 of the connecting rod means 40.

In all embodiments described above the springy plate elements 12, 31, 42, 43 may be made of springy steel, but the invention also contemplates the use of other springy materials such as plastic, for example. The material used for the connecting rod means is required only to have a certain degree of rigidity while at the same time being sufficiently elastic to be capable of becoming resiliently deformed, without fatigue, during operation of the compressor so as to compensate for any lack of parallelism between the axes A and B.

Thus, according to a further embodiment of the invention it is possible to construct the connecting rod means including the bearings thereof from a plastic material with or without the use of reinforcing elements, and such a construction can be manufactured in a single step by casting or pressing. Such a connecting rod means without any reinforcements is illustrated in FIG. 7 where it will be seen that the connecting rod means 50 is made in its entirety of a one-piece plastic body. This connecting rod means includes the bearings 54 and 55 which have relatively thick walls as well as the elongated substantially rigid portion 51 extending between the bearings and also being relatively thick. However, between the elongated rigid member 51 and the bearings 54 and 55, which are also rigid, the connecting rod means 50 includes the springy yieldable portions 52 and 53 which are considerably thinner than the remainder of the connecting rod means 50 so that the latter is also provided in the zones X and Y with springy yieldable portions capable of bending as described above in order to compensate for any lack of parallelism between the axes A and B. Of course, if desired, metallic reinforcing or stiffening members can be embedded in the plastic material of the connecting rod means 50, in the elongated portion 51 thereof, for example, by placing a suitable stiffening plate in the mold and pouring the plastic around such a stiffening plate so that the latter is embedded in the final product.

It will be understood that each of the elements described above, or two or more together, may also find a useful application in other types of transmissions differing from the types described above.

While the invention has been illustrated and described as embodied in connecting rod transmissions, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A connecting rod transmission for a compressor or the like, comprising, in combination, rotary crank means having a given axis about which said crank means rotates; cylinder means having an axis perpendicular to said axis of said crank means; piston means longitudinally slidable in said cylinder means; and connecting rod means operatively connected to said crank means for turning movement of said connecting rod means relative to said crank means about a first turning axis substantially parallel to said axis of said crank means, and said connecting rod means operatively connected to said piston means for transmitting rotary movement of said crank means to said piston means to reciprocate the latter in said cylinder means, said connecting rod means having at least one yieldable portion forming only a relatively small fraction of the entire connecting rod means and said connecting rod means being rigid except for said yieldable portion thereof, and said connecting rod means and piston means being operatively connected to each other for turning movement of said connecting rod means relative to said piston means about a second turning axis substantially parallel to said axis of said crank means, said yieldable portion being deformable in a direction transverse to the plane of movement of said connecting rod means and resisting deformation in said plane of movement thereof, said connecting rod means yielding only in said transverse direction at said relatively small yieldable portion thereof to compensate for any lack of parallelism between said second turning axis and the axis of said crank means while maintaining substantially fixed the distance between said first and second turning axes.

2. A connecting rod transmission for a compressor or the like, comprising, in combination, rotary crank means having a predetermined crank axis about which said crank means rotates; cylinder means having an axis perpendicular to said crank axis; piston means axially slidable in said cylinder means; and connecting rod means operatively connected to said rotary crank means for turning movement of said connecting rod means relative to said crank means about a first turning axis substantially parallel to said axis of said crank means, and said connecting rod means operatively connected to said piston means for reciprocating the latter in said cylinder means in response to rotary movement of said crank means, said connecting rod means being connected to said piston means for turning movement relative thereto about a second turning axis substantially parallel to said crank axis and said connecting rod means having a springy yieldable portion forming only a small fraction of the entire connecting rod means, said connecting rod means being rigid except for said springy yieldable portion thereof, said yieldable portion being deformable in a direction transverse to the plane of movement of said connecting rod means and resisting deformation in said plane of movement thereof and said connecting rod means yielding only in said transverse direction at said springy yieldable portion thereof to compensate for any lack of parallelism between said second turning axis and said crank axis while maintaining substantially fixed the distance between said first and second turning axes.

3. A transmission as recited in claim 2, and wherein said yieldable portion of said connecting rod means is situated between the connections of said connecting rod means to said crank means and piston means.

4. A connecting rod transmission for compressors or the like, comprising, in combination, rotary crank means having a predetermined crank axis about which said crank means rotates; cylinder means having an axis perpendicular to said crank axis; a piston axially slidable in said cylinder means; and connecting rod means having a pair of opposed end portions respectively connected operatively with said crank means for turning movement of said connecting rod means relative to said crank means about a first turning axis substantially parallel to said axis of said crank means, and with said piston means for reciprocating said piston means in said cylinder means in response to rotation of said crank means, said connecting rod means being operatively connected to said piston means for turning movement relative thereto about a second turning axis substantially parallel to said crank axis, and said connecting rod means having in the region of said end portions thereof a pair of springy yieldable portions, respectively, forming but a small fraction of the entire connecting rod means, said connecting rod means being rigid except for said yieldable portions thereof, said yieldable portions being deformable in a direction transverse to the plane of movement of said connecting rod means and resisting deformation in said plane of movement thereof and said connecting rod means yielding only in said transverse direction at said yieldable portions thereof to compensate for any lack of paralelism between said second turning axis and said crank axis while maintaining substantially fixed the distance between said first and second turning axes.

5. A transmission as recited in claim 4, and, wherein said connecting rod means includes a relatively flat springy plate located substantialy in a plane normal to said turning axis and crank axis and a substantially rigid plate structure fixed to said springy plate at at least one face thereof and covering said springy structure at said one face thereof over its entire area except for said springy yieldable portions, the latter being exposed by said plate structure so as to be free to yield.

6. In a transmission as recited in claim 5, said plate structure being riveted to said spring plate to prevent yielding of the latter except at said yieldable portions thereof.

7. In a transmission as recited in claim 4, said connecting rod means including a flat springy plate located in a plane substantially normal to said turning axis and crank axis, and said connecting rod means including a relatively rigid plate structure engaging opposed faces of said springy plate at all parts thereof except said yieldable portions so that the latter are exposed and are free to yield.

8. In a transmission as recited in claim 7, said plate structure including a pair of plates engaging the opposed faces of said springy plate and rigidly riveted thereto.

9. A connecting rod transmission for compressors or the like, comprising, in combination, rotary crank means having a crank axis about which said crank means rotates; cylinder means having an axis perpendicular to said crank axis; piston means axially slidable in said cylinder means; and connecting rod means having a pair of opposed end portions respectively connected operatively to said crank means for turning movement of said connecting rod means relative to said crank means about a first turning axis substantially parallel to said axis of said crank means, and to said piston means for reciprocating the latter in said cylinder means in response to rotation of said crank means, said connecting rod means being connnected to said piston means for turning movement relative thereto about a second turning axis substantially parallel to said crank axis and said connecting rod means including a flat springy plate located in a plane which is substantially normal to said crank axis and a substantially rigid plate structure fixed to said springy plate and covering the latter almost entirely at at least one face thereof, said substantially rigid plate structure exposing portions of said springy plate adjacent the end portions of the latter and only said exposed portions of said springy plate being free to yield in a direction transverse to said plane to compensate for any lack of parallelism between said second turning axis and said crank axis, said springy plate resisting deformation in the plane of said plate whereby the distance between said first and second turning axes remains substantially fixed, said plate structure including at least one elongated plate extending longitudinally along a substantial portion of said springy plate and having at least one longitudinal reinforcing rib.

10. A connecting rod transmission for compressors or the like, comprising, in combination, rotary crank means having a predetermined crank axis and a crank pin which is displaced from and rotates about said crank axis; a cylinder perpendicular to said crank axis; a piston slidable in said cylinder and carrying a transverse pin which is substantially parallel to said crank axis; a pair of bearing means respectively receiving said crank pin and said transverse pin carried by said piston, said pair of bearing means respectively having rigid radial portions fixed respectively to said pair of bearing means at the exteriors thereof and directed away from each other; elongated connecting rod means having a pair of opposed end portions respectively formed with openings through which said pair of bearing means respectively extent with clearance, said connecting rod means having adjacent said pair of bearings a pair of springy yieldable portions which form but a small part of the entire connecting rod means the remainder of which is substantially rigid; and fixing means fixing said radial portions of said bearing means to at last parts of said end portions of said connecting rod means whereby the latter will reciprocate said piston in said cylinder in response to rotation of said crank means while said connecting rod means is free to yield at said yieldable portions thereof to compensate for any lack of parallelism between said crank axis and said transverse pin of said piston means.

11. A connecting rod transmission for compressors or the like, comprising, in combination, rotary crank means having a crank axis about which said crank means rotates; a cylinder and a piston slidable therein, said cylinder and piston having a common axis perpendicular to said crank axis; and connecting rod means operatively connected to said piston and crank means for reciprocating said piston and said cylinder in response to rotary movement of said crank means, said connecting rod means including a pair of bearings at opposed ends of said connecting rod means, respectively, said bearings being operatively connected with said piston and crank means for providing turning of said connecting rod means relative to said piston and crank means, the bearing of said connecting rod means which is connected to said piston defining a predetermined turning axis of said connecting rod means relative to said piston which is substantially parallel to said crank axis, said connecting rod means further including an elongated substantially rigid member situated between said bearings and terminating in free ends adjacent to but spaced from said bearings, and said connecting rod means including a pair of springy plates respectively fixed to said elongated rigid member, respectively projecting from said ends thereof, and respectively fixed to said bearings to provide for springy yielding of said connecting rod means at the space between said bearings and said ends of said elongated rigid member therebetween, whereby said connecting rod means can yield to compensate for any lack of parallelism between said turning axis and said crank axis.

12. A transmission as recited in claim 11, and wherein said bearings and elongated rigid member are respectively formed with slits which receive said springy plates.

13. A connecting rod transmission for compressors or the like, comprising, in combination, rotary crank means having a crank axis about which said crank means rotates; a cylinder perpendicular to said crank axis; a piston axially slidable in said cylinder; and one-piece connecting rod means operatively connected to said piston and crank means for reciprocating said piston in response to rotary movement of said crank means, said one-piece connecting rod means including at opposed end portions thereof a pair of bearings respectively connected with said crank means and piston and the bearing which is connected with said piston defining a predetermined turning axis of said connecting rod means relative to said piston and said turning axis being substantially parallel to said crank axis, said one-piece connecting rod means having in the region of said bearings portions forming but a small fraction of the entire connecting rod means and having a thickness substantially less than the thickness of the remainder of said connecting rod means and said portions of said connecting rod means being yieldable while the remainder thereof is substantially rigid whereby said connecting rod means can yield at said portions thereof to compensate for any lack of parallelism between said turning axis and crank axis.

14. A transmission as recited in claim 13, and wherein said one-piece connecting rod means is made of plastic.

15. A connecting rod transmission for compressors or the like, comprising, in combination, rotary crank means having a predetermined crank axis about which said crank means rotates; cylinder means having an axis perpendicular to said crank axis; a piston axially slidable in said cylinder means; and connecting rod means having a pair of opposed end portions respectively connected operatively with said crank means and piston means for reciprocating said piston means in said cylinder means in response to rotation of said crank means, said connecting rod means being operatively connected to said piston means for turning movement relative thereto about a turning axis substantially parallel to said crank axis, and said connecting rod means having in the region of said end portions thereof a pair of springy yieldable portions, respectively, forming but a small fraction of the entire connecting rod means, each of said yieldable portions including a flat springy plate located in a plane substantially normal to said turning axis and crank axis, said connecting rod means being substantially rigid except for said yieldable portions thereof and including a relatively rigid plate structure engaging opposed faces of said springy plate at all parts thereof except said yieldable portions so that the latter are exposed and are free of yield, said plate structure including one plate engaging one face of said springy plate and a second plate engaging the other face of said springy plate and having edge portions of channel-shaped configuration receiving in their interiors opposed edges of said springy plate and said one plate, and said connecting rod means yielding at said yieldable portions thereof to compensate for any lack of parallelism between said turning axis and crank axis.

References Cited by the Examiner

UNITED STATES PATENTS

| | | | |
|---|---|---|---|
| 1,313,764 | 8/1919 | Thurston | 74—581 |
| 1,927,617 | 9/1933 | Schmidt | 74—581 |
| 2,300,335 | 10/1942 | Bonebrake | 74—581 |
| 2,758,481 | 8/1956 | Mouravieff | 74—581 |
| 2,764,134 | 9/1956 | Crimi | 123—197 |

MILTON KAUFMAN, *Primary Examiner.*

BROUGHTON G. DURHAM, *Examiner.*

W. S. RATLIFF, *Assistant Examiner.*